Oct. 24, 1933.  J. LUTON  1,931,585
METHOD AND MEANS FOR MOLDING ARTICULATED ARTICLES
Filed Feb. 29, 1932  2 Sheets-Sheet 1
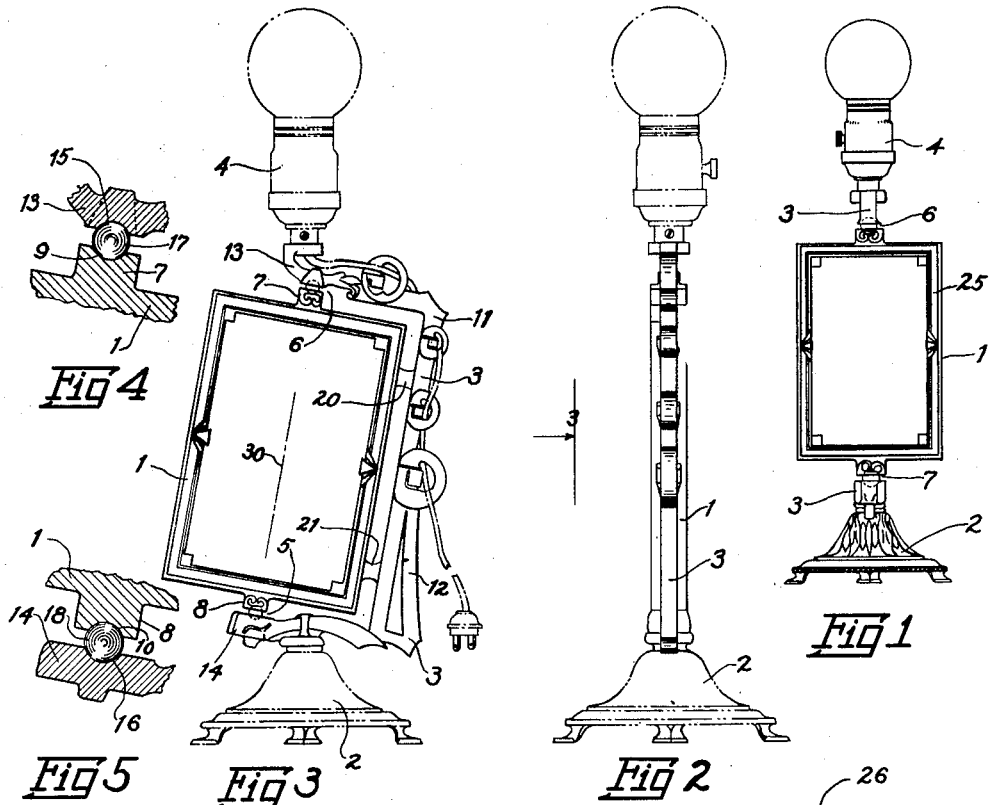
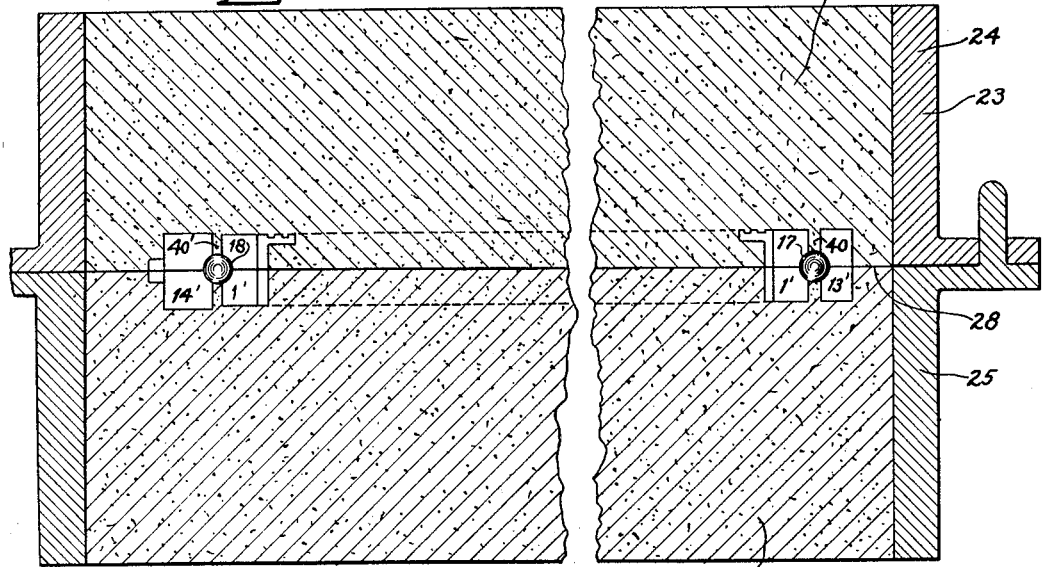
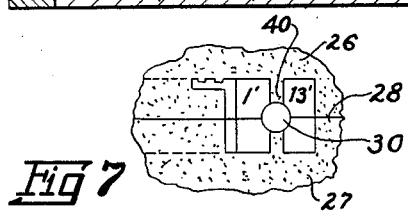
INVENTOR.
John Luton.
BY Slough and Canfield
ATTORNEYS.

Oct. 24, 1933.　　　　J. LUTON　　　　1,931,585
METHOD AND MEANS FOR MOLDING ARTICULATED ARTICLES
Filed Feb. 29, 1932　　2 Sheets-Sheet 2

INVENTOR.
John Luton.
BY Slough + Canfield
ATTORNEYS

Patented Oct. 24, 1933

1,931,585

UNITED STATES PATENT OFFICE 1,931,585

METHOD AND MEANS FOR MOLDING ARTICULATED ARTICLES

John Luton, Cleveland Heights, Ohio

Application February 29, 1932. Serial No. 595,721

3 Claims. (Cl. 22—190)

This invention relates to the molding of articles from molten metal and to the articles so molded.

My invention relates particularly to the molding of articles consisting of two or more parts which are movable, one relative to the other.

It is an object of my invention to provide a method and means for molding from molten metal or the like, articles generally consisting of two or more relatively movable parts.

Another object is to provide a method and means for molding articles of this type wherein it is desired to provide a smooth, durable bearing connection between the said relatively movable parts.

Another object is to provide a method and means for molding articles comprising two or more relatively movable parts whereby a rotary bearing connection may be provided between the relatively movable parts and which will be smooth and durable in use.

Another object of my invention is to provide an improved method and means for molding articles from cast metal consisting of two or more relatively movable parts wherein an improved bearing connection may be made between the relatively movable parts comprising mutually engaged steel and chilled iron bearing surfaces.

Another object is to provide a method and means for molding from molten ferrous metal articles consisting of two or more relatively movable parts having a bearing connection therebetween comprising a steel ball in confronting sockets, the sockets formed by casting the metal upon the ball.

Another object is to provide an improved core construction adaptable to be used in molding or founding processes.

Other objects will be apparent to those skilled in the art to which my invention appertains.

My invention is fully disclosed in the following description taken in connection with the accompanying drawings, in which:

Fig. 1 is an elevational view of an article embodying my invention and illustrative of one class of article to which my invention is applicable;

Fig. 2 is a view to a larger scale illustrating the construction of the article of Fig. 1 and the mode of making it.

Fig. 3 is a view taken from the plane 3 of Fig. 2;

Figs. 4 and 5 are fragmentary cross-sectional vews to an enlarged scale of adjacent parts of Fig. 3;

Fig. 6 is a cross-sectional view of a molding flask showing a mold therein and illustrating a mode of operation of my invention in connection with casting the article of Figs. 1 to 5;

Fig. 7 is a fragmentary view of a part of Fig. 6 with a ball which I may employ omitted;

Figure 8:
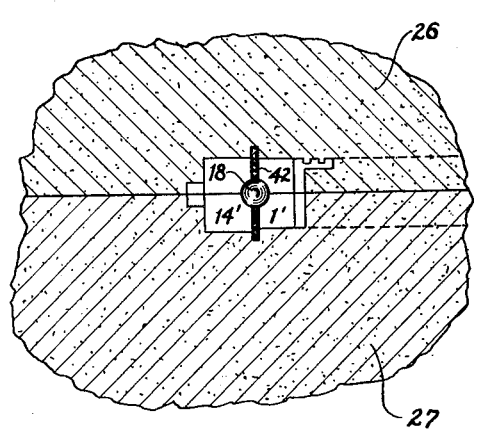
Fig. 8 is a fragmentary view similar to a part of Fig. 6 showing a modification.

My invention is applicable to numerous uses and may be embodied in various devices but I have chosen to illustrate and describe it herein in connection with a combined lamp stand and picture frame. Referring to Fig. 1 I have shown at 2, the supporting base of the article and at 3—3 portions of a lamp stand proper surmounted by an electric lamp 4. Supported on the stand 3—3 is a picture frame 25 mounted to be oscillated or rotated on bearing constructions 5 and 6 at upper and lower portions of the frame.

In Fig. 1 is illustrated the generally preferred positional arrangement of the parts in use but in order to simplify the description I have illustrated in Figs. 2 and 3 the relative position of the parts during the process of making the same wherein it will be seen that the picture frame 1 of Fig. 1 has been rotated into substantially an angle of 90°. Fig. 2 illustrates the article of Fig 1 after the frame 25 has been rotated thru an angle of 90° and Fig. 3 illustrates the parts of Fig. 2 when viewed from plane 3 of Fig. 2. In Figs. 2 and 3 I have illustrated the frame 1, and the lamp stand proper 3—3 in solid lines and base 2 and the lamp 4 in broken lines in order to more clearly set forth certain features of my invention in connection with the following description.

The picture frame 1, is generally rectangular and quadrilateral and, substantially at the center of the upper and lower reaches of the frame, there are provided respectively boss like projections 7 and 8, having generally spherical sockets, outwardly concave therein.

The lamp stand proper, 3—3 comprises generally a C-shaped body 11, having a generally vertical portion 12 and an upper and a lower generally horizontal portion 13 and 14 respectively, which overhang and underhang the upper and lower portions of the picture frame 1. In the portion 13, is a downwardly concave spherical socket 15, and in the portion 14 is an upwardly concave spherical socket 16. Balls 17 and 18 are disposed respectively within the confronting sockets 9 and 15 and 10 and 16 and provide bearing devices or constructions 5 and 6 respectively referred to in connection with Fig. 1.

The stand proper 3—3 comprising the portions 12, 13 and 14 and the picture frame 1 and the bearing constructions 5 and 6, are formed complete and in assembled relation by a single metal casting operation. It is one of the great advantages and useful purposes of my invention that it provides an article, and the method of making it, consisting of two parts, illustrative of which are the lamp stand and picture frame above described, which when taken from the mold in which they are cast, comprise the interconnecting rotary bearing construction such as 5 and 6 and without requiring additional labor or time to provide this bearing connection. In the art of founding, the difference between profit and loss in the molding of an article for sale often resides in a few cents or a few minutes of time in the casting operation. In connection with the article under immediate consideration herein, it is of course obvious that the lamp stand proper could be cast by itself and the frame 1, cast by itself and subsequently the ball and socket bearing connections 5 and 6, or a pin bearing construction or rivet bearing construction in substitute thereof, could be provided to join these two parts together in relatively rotatable relations but such a procedure would necessitate a total cost of time and labor greatly in excess of that required to produce the article by my method and means will now be more fully described.

I first provide a molding pattern like or similar to the solid line portion of Figs. 2 and 3 and comprising the picture frame 1 and the lamp stand 3—3, in the relatively rotated positions of those figures, and the pattern comprising also a portion corresponding to the visible part of the balls 18 and 17 and comprising also gate portions 20 and 21 connecting the stand 3 with the frame 1.

Such a pattern is then used for making a mold in any of the usual well known ways, as for example by means of a flask illustrated in Fig. 6 generally at 23 and comprising a cope 24 and a drag 25 and sand 26 and 27 therein respectively. When the pattern has been removed from the sand in the flask and the two parts of the flask put back together along the well known parting line 28, a mold will be left in the sand. Fig. 7 has been drawn to illustrate such a mold and shows the mold in cross section, the plane of the cross section corresponding to the plane 30 of Fig. 3 for a mold made with a pattern substantially like the solid line portions of Fig. 3. The mold is then seen to comprise portions 13', 1' and 14', corresponding to portions 13, 1 and 14 of Fig. 3.

In Fig. 6, the mold portions above described are not only shown but there is shown also in the mold the balls 18 and 17 of Fig. 3. Fig. 7 therefore, illustrates the true configuration of the mold adjacent to portion 13' as it would appear if the pattern were removed from the sand and the two parts of the flask reassembled on the parting line 28, and the mold is thus seen to comprise a spherical portion 30, between the portions 13' and 1'. There will also be a similar portion in the mold between the portions 1' and 14' although this has not been illustrated. The ball 17 is placed in the spherical mold portion 30 and the ball 18 in the similar mold portion before the two halves of the flask are placed together, so that the finished mold will be in the condition of Fig. 6. In this figure it will be noted that the balls 18 and 17 are supported in a predetermined position with respect to the mold portions 13' and 1' and 1' and 14' respectively, upon inwardly projecting annular portions 40—40' of green sand. Opposite halves of the balls 17 and 18 project into the mold portions, 1', 13' and 1', 14' respectively.

When the molten metal is poured into the mold Fig. 6 in any well known manner, it will fill the mold portions 13', 1' and 14' and will embrace opposite portions of the balls 17 and 18. The balls are thus trapped between the corresponding portions of the cast metal when the latter has cooled and the ball and socket rotary bearing connections described above in connection with Figs. 1 to 5 and illustrated at generally 6 and 7 are thus produced.

Where cast-iron is used as the molten casting metal, and where balls 17 and 18 of substantial size are employed, the heat of the molten iron adjacent to the balls will be conducted into the balls and thence into the sand in the flask supporting the balls, and at such a rate of conduction that the balls will remain relatively cool and the molten metal adjacent to balls will be rapidly chilled resulting, with respect to the iron, in the crystallizing of the iron in a well known manner to form an exceedingly hard "chill" surface.

Thus when cast iron is used, the ball bearing or rotary bearing connection thus provided comprises a hard steel ball rotatably supported in opposite confronting sockets exactly fitting the ball and having chilled surfaces; and such a bearing as is well known will be very durable and will provide free rotary movement.

After the metal has cooled therefore, and the solidified cast metal is removed from the sand, the two parts thereof, that is the lampstand proper 3 and the frame 1, are joined together by the gate portion 20 and 21 which forms part of the pattern as described. These may now be broken off as is well understood in connection with casting gates and the remnants thereof if any, may be ground off smoothly upon the frame 1 and the stand proper 3. And such operation completes this part of the article, no operation being required on the bearing constructions 6 and 7. Thus the stand proper 3 and the frame 1, bearing construction 5 and 6, are all produced by a single casting operation, whereas heretofore, even in the best known processes, there have been necessary two casting operations, one for the stand and one for the frame followed by additional operations to produce some kind of a bearing construction, and even after these additional operations, which my invention eliminates, have been performed, the bearing construction heretofore provided has not had certain qualities which my bearing construction has and which render it superior to prior bearings. Such qualities are, the neatness thereof, whereby it may be embodied in ornamental and artistic articles; the durability thereof inasmuch as it comprises a hard steel portion bearing upon a chilled cast portion; and the simplicity thereof, consisting, besides cast metal, of nothing but a steel ball which can be procured commercially very cheaply from ball bearing manufacturers; and the true axial alignment of the two bearing constructions inasmuch as they automatically take up a common axis of rotation due to the ball and socket construction, etc. etc.

Having thus produced the frame 1 and the lamp stand proper 3—3, the lamp 4 may be secured to the portion 13 and a base 2 of any suitable construction may be secured to the portion 14 by the usual method.

It is entirely possible that by suitably designing the base 2, it may be formed integrally with the stand proper 3 by forming a base on the pattern as will be understood.

In Figs. 8 to 11 inclusive I have illustrated a modification of the embodiment and practice of my invention. In this form, the balls such for example as the ball 18, instead of being supported upon the inwardly projecting annular portion 40' of green sand, is supported upon a relatively rigid core preferably of circular disc-like form. The core is shown separately in Figs. 9 and 10, assembled with the ball, and the preferred mode of making the same is to first form a circular disc 42 having a central perforation at 43 therein slightly smaller than the diameter of the ball 18 and then forceably projecting the ball into the perforation whereby it may be supported by the constricting periphery of the perforation 43. The disc 42 may be made of any suitable material but in one suitable mode of practicing my invention, it is formed from cardboard or fiberboard or the like, and is preferably given a coating of shellac to smooth the surface thereof.

Figure 11:
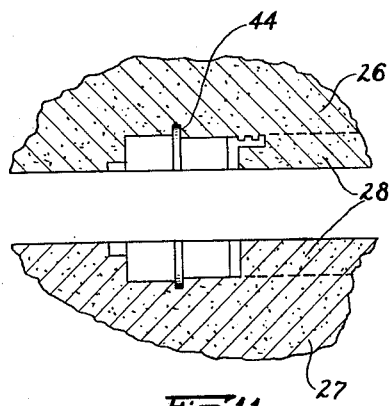
Fig. 11 is a view illustrating the modification of Fig. 8 but showing the parts in different positions and the mold thereof in a different stage of production.
Figure 9:
Figs. 9 and 10 are views showing a core element of the mold which I may employ in connection with the modification of Fig. 8, the views being respectively front elevational and side elevational views.
Figure 10:
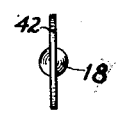

The pattern for making the mold is so formed that it leaves in the mold, as shown in Fig. 11, a print 44 substantially of the size and shape of the disc 42, one-half of the print being formed in the sand 26 and the other half in the sand 27. Thus when the two halves of the mold are brought together along the pointing line 28, the mold will have therein a portion 44 the same size and shape of the disc.

Before placing the two halves of the mold together, the disc is set in one-half of the mold and the other half of the mold applied thereto; and when this has been accomplished, the parts take up the position shown in Fig. 8 where, as shown in cross-section, the disc 42 supports the ball 18 between the mold portions 1', 14' and with opposite sides of the ball 18 projecting into said mold portions. The faces of the disc 42 thus form part of the mold and determine the shape of the metal in the mold portions 1' and 14'.

I have found that although cardboard or like materials which may be employed for the disc 42 are generally combustable, yet when enclosed in a mold in this manner the contact therewith of the molten metal does not cause the same to be burned in a manner to consume it, but rather produces a charring effect upon the disc which does not destroy its properties of molding the molten metal or of supporting the ball in its proper position in the mold.

My invention is not limited to the articles illustrated and described above nor to the exact construction thereof nor to the exact details of the method illustrated and described. Many changes and modifications may be made therein without departing from the spirit of my invention or sacrificing its advantages, and the method of molding articles above set forth may be applied to a great variety of articles other than those illustrated.

I claim:

1. The method of molding an article comprising a pair of cast parts having rotary bearing connection with each other on two coaxially spaced bearings which includes forming a pattern of the two parts integrally joined by coaxially aligned and spaced annular, outwardly convex, sphere surface segments, making a molding cavity from the pattern, supporting two metal spherical balls of substantially the same spherical radius as that of the said sphere surface segments in the cavity upon the portions of the cavity formed by the said annular sphere segments of the pattern, and pouring molten metal into the cavity and around the balls on opposite sides thereof.

2. The method of molding an article comprising a pair of cast parts having rotary bearing connection with each other on two coaxially spaced bearings which includes forming a continuous mold cavity of the form of the two parts, in their relatively assembled positions, the mold having a pair of annular coaxially aligned and spaced inwardly concave sphere surface segments, disposed each between the two part portions of the mold, supporting two metal spherical balls of the same sphere radius as that of the sphere surface segments in the mold cavity upon the said annular sphere surface segments, and pouring molten metal in the mold and around the balls on opposite sides thereof.

3. The method of molding an article comprising a pair of cast parts having rotary bearing connection with each other on two coaxially spaced bearings which includes forming a continuous mold cavity of the form of the two parts in their relatively assembled positions, forming a pair of generally washer form core elements, having affixed in the central perforation of each core element, a metal ball, projecting from opposite sides thereof, supporting the core elements in the mold cavity with their central perforations coaxially spaced and aligned and with the core elements dividing the mold cavity into two part portions and pouring molten metal in the mold cavity and upon each side of the core elements and around the opposite projecting portions of the balls.

JOHN LUTON.